United States Patent
Pirovano

(10) Patent No.: US 7,854,016 B2
(45) Date of Patent: Dec. 14, 2010

(54) PROCESS FOR MANUFACTURING PROBES INTENDED TO INTERACT WITH A STORAGE MEDIUM AND PROBE OBTAINED THEREBY

(75) Inventor: Agostino Pirovano, Corbetta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 427 days.

(21) Appl. No.: 11/958,977

(22) Filed: Dec. 18, 2007

(65) Prior Publication Data

US 2008/0145603 A1 Jun. 19, 2008

(30) Foreign Application Priority Data

Dec. 19, 2006 (IT) .......................... TO2006A0904

(51) Int. Cl.
- *G01Q 20/04* (2010.01)
- *G01Q 70/12* (2010.01)
- *G01Q 70/14* (2010.01)
- *G01Q 80/00* (2010.01)

(52) U.S. Cl. .................. 850/60; 977/902; 977/943; 977/947; 850/7; 850/52; 850/55; 850/56; 850/57; 850/58; 850/59; 850/62

(58) Field of Classification Search .................. 850/52, 850/56, 57, 59, 60, 62, 63, 55, 58, 7; 369/13.01, 369/13.02, 13.24, 13.28, 13.29, 13.33, 99, 369/100, 101, 15, 126, 127; 977/943, 947, 977/902; 257/213, 215, 225, 226; 430/269, 430/322, 330; 73/104, 105, 866.5; 365/189.011, 365/189.14, 189.15, 186.16, 220, 221, 222
See application file for complete search history.

(56) References Cited

U.S. PATENT DOCUMENTS

| | | | | |
|---|---|---|---|---|
| 5,953,306 | A * | 9/1999 | Yi | 369/126 |
| 6,614,243 | B2 * | 9/2003 | Klehn et al. | 324/750 |
| 2004/0218507 | A1 * | 11/2004 | Binnig et al. | 369/154 |
| 2005/0018616 | A1 | 1/2005 | Schniedenharn | |
| 2005/0162932 | A1 * | 7/2005 | Ricotti et al. | 365/189.05 |
| 2005/0241374 | A1 * | 11/2005 | Schlaf | 73/105 |
| 2008/0142709 | A1 * | 6/2008 | Sumant et al. | 250/306 |
| 2008/0316906 | A1 | 12/2008 | Bollati et al. | |
| 2009/0003188 | A1 * | 1/2009 | Albrecht et al. | 369/154 |
| 2009/0003189 | A1 * | 1/2009 | Binnig et al. | 369/154 |
| 2010/0017922 | A1 * | 1/2010 | Shin et al. | 850/21 |

\* cited by examiner

*Primary Examiner*—Jack I Berman
*Assistant Examiner*—Nicole Ippolito Rausch
(74) *Attorney, Agent, or Firm*—Lisa K. Jorgenson; Robert Iannucci; Seed IP Law Group PLLC

(57) ABSTRACT

A process manufactures a probe intended to interact with a storage medium of a probe-storage system, wherein a sacrificial layer is deposited on top of a substrate; a hole is formed in the sacrificial layer; a mold layer is deposited; the mold layer is etched via the technique for forming spacers so as to form a mold region delimiting an opening having an area decreasing towards the substrate. Then a stack of conductive layers is deposited on top of the sacrificial layer, the stack is etched so as to form a suspended structure, formed by a pair of supporting arms arranged to form a V, and an interaction tip projecting monolithically from the supporting arms. Then a stiffening structure is formed, of insulating material, and the suspended structure is fixed to a supporting wafer. The substrate, the sacrificial layer, and, last, the mold region are then removed.

26 Claims, 5 Drawing Sheets

PROCESS FOR MANUFACTURING PROBES INTENDED TO INTERACT WITH A STORAGE MEDIUM AND PROBE OBTAINED THEREBY

BACKGROUND

1. Technical Field

The present invention relates to a process for manufacturing a probe that is designed to interact with a storage medium and to a probe thus obtained.

2. Description of the Related Art

As is known, storage systems that exploit a technology based upon magnetism, such as, for example, hard disks, suffer from important limitations as regards the increase of the data-storage capacity and the read/write rate, and the reduction in their dimensions. In particular, a physical limit exists, the so-called "superparamagnetic limit", which hinders the dimension reduction of the magnetic storage domains below a critical threshold, if the risk of losing the stored information is to be avoided.

In the last few years, alternative storage systems have consequently been proposed, amongst which the so-called "probe-storage systems" (also referred to as "atomic-level storage systems" or "atomic storage systems") have assumed particular importance. These systems enable high data-storage capacities on media of small dimensions and with low production costs to be achieved.

In brief, FIG. 1, a probe-storage device 1 comprises a two-dimensional array of transducers (or probes) 2, fixed to a common substrate 3, for example of silicon. The array is arranged on top of a storage medium 4 and is mobile relatively to the storage medium, generally in two mutually orthogonal directions, by the action of a micromotor associated therewith. Each probe 2 is equipped with a supporting element 5 of semiconductor material, in particular silicon, generally known as "cantilever", suspended in cantilever fashion on top of the storage medium 4, and carrying at one free end thereof an interaction element (also referred to as "sensor" or "contact element" and referred to hereinafter as "tip" 6) facing the storage medium 4. In particular, herein the term "interaction" includes any operation of reading, writing or erasing that implies an exchange of signals between the tip 6 and the storage medium. Via the respective tip 6, each probe 2 is able to locally interact with a portion of the storage medium, for writing/reading/erasing individual bits of information.

The physical characteristics (hardness, roughness, etc.), morphological characteristics (dimensions, shape, etc.) and electrical characteristics (resistivity, thermal conductivity, etc.) of the tip 6 are strictly correlated to the material of the storage medium with which they are associated (polymeric, ferroelectric, phase-change material, etc.), and to the interaction mechanisms for reading/writing/erasing data (thermal process, passage of charge, etc.).

For example, storage systems of the probe-storage type are possible, wherein reading/writing of the individual bits is performed by interacting with the storage material via a passage of electrical charges through the tip.

Currently, some proposed solutions use a polymeric material for storage of the data, and silicon tips (coated with native oxide) for providing the interaction structure. However, the polymeric material does not enable passage of electrical charges. To overcome this problem, it is possible to deposit a very thin conductive layer on top of the silicon tip (after removal of the native oxide). However, this solution has not proven practically feasible, in so far as the silicon tip is formed only at the end of the integration process so as to protect the silicon tip while forming the cantilever structure and bonding the wafers. Furthermore, the deposition of a thin layer of conductive material causes an increase in the tip radius with respect to the original tip dimension, thus reducing the obtainable storage density. In fact, if the storage area is, for example, 1 cm$^2$, it is necessary to mold and etch features of 10 nm to obtain a memory of 50 GB.

BRIEF SUMMARY

One embodiment of the present invention is a process for manufacturing a tip for interaction with a storage medium through a charge passage that enables a good dimensional control of the tip.

BRIEF DESCRIPTION OF THE SEVERAL VIEWS OF THE DRAWINGS

For a better understanding of the invention, some embodiments thereof are now described, purely by way of non-limiting example and with reference to the attached drawings, wherein.

DETAILED DESCRIPTION

Figure 2:
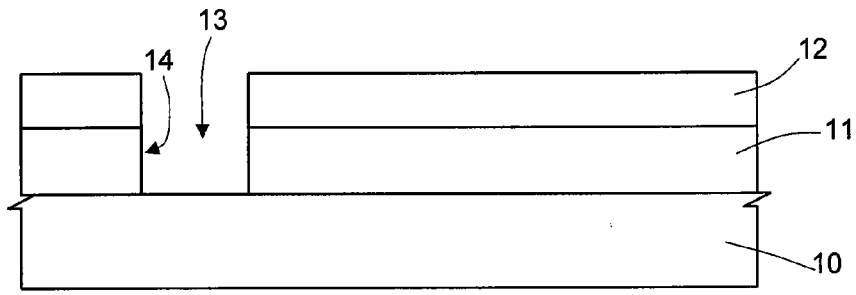
FIGS. 2-4 are cross-sections of a wafer of semiconductor material in successive steps of a manufacturing process according to a first embodiment of the present invention.

Initially, as illustrated in FIG. 2, a sacrificial layer 11, for example, of silicon oxide having a thickness of, for example, 200 nm, is deposited on a substrate 10 of semiconductor material, typically monocrystalline silicon. Then, using a resist mask 12 having a window 13, the sacrificial layer 11 is etched to form a hole 14.

Figure 3:
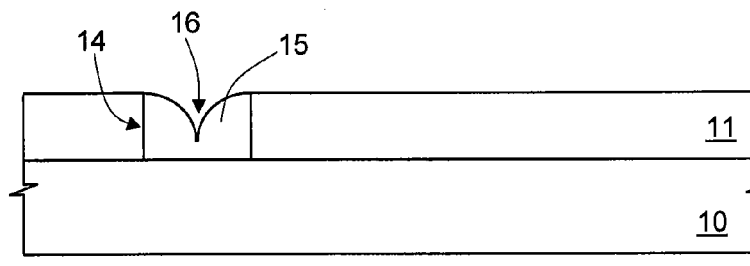

Next (FIG. 3), a mold layer, for example of silicon nitride, is deposited and is plasma etched via the standard technique for providing spacers. The etch is interrupted after, within the hole 14, a mold region 15 has been formed, which delimits an opening 16, having, in a section parallel to the surface of the substrate 10, an area that decreases towards the substrate 10. In practice, in the cross-section of FIG. 3, the opening 16 is approximately V-shaped with arched sides and the vertex facing the substrate 10.

In this step, the lithography is not critical, and can be defined less stringently; in fact, the dimensions and shape of the opening 16 can be chosen according to the requirements by controlling the following parameters:

size of the hole 14;

thickness of the sacrificial layer 11; and composition of the plasma used for the etch.

For example (FIG. 3), the end of the opening 16 is pointed and does not reach the bottom of the hole 14. Alternatively, the end can extend as far as the substrate 10 (and hence have a larger area, as explained in greater detail hereinafter with reference to FIG. 12). Furthermore, in the example considered, the hole 14 and thus the outer surface of the mold region 15 are circular. Consequently, the opening 16 has an approximately conical shape with a hollowed surface. However, other shapes are possible, as indicated in greater detail hereinafter.

Figure 4:
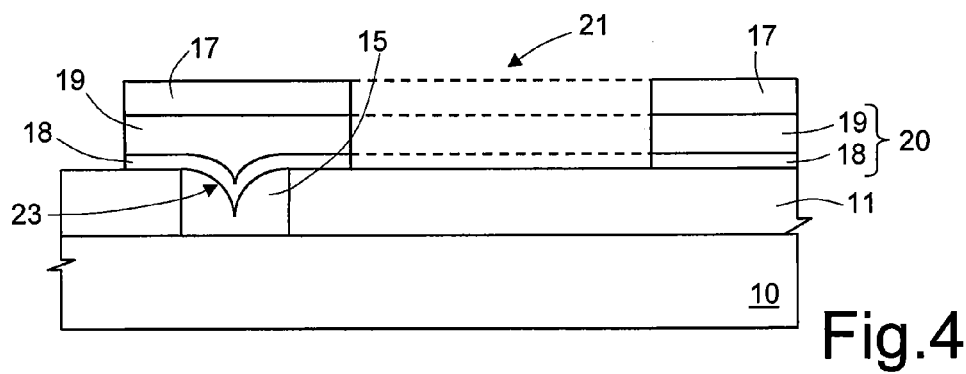

Next (FIG. 4), a first metal layer 18 and a second metal layer 19 are deposited in succession to form a stack 20. The metal layers 18, 19 fill the opening 16, forming a tip 23, and are subsequently shaped using a resist mask 17.

In general, the type of material used and the thickness of the metal layers 18, 19 can be chosen so as to optimize the electrical and mechanical characteristics of the suspended structure (for example the stiffness).

In particular, the metal layers 18, 19 can be chosen so as to meet different requirements: the first metal layer 18 can be made of a material suitable for reading/storing information, for example it can be of titanium, compounds of titanium, cobalt, carbon, and metal barrier materials, such as tantalum and its compounds, for example TaN, TiAlN, TiSiN, while the second metal layer 19 can be made of a more conductive material so as to reduce the access resistance and reduce the voltage drop on the supporting arms; for example, it can be of thick TiN or aluminum. In the example considered, moreover, the first metal layer 18 is thinner than the second metal layer 19. For example, the first metal layer can have a thickness of 10 nm, and the second metal layer 19 can have a thickness of 60-100 nm.

Figure 5:
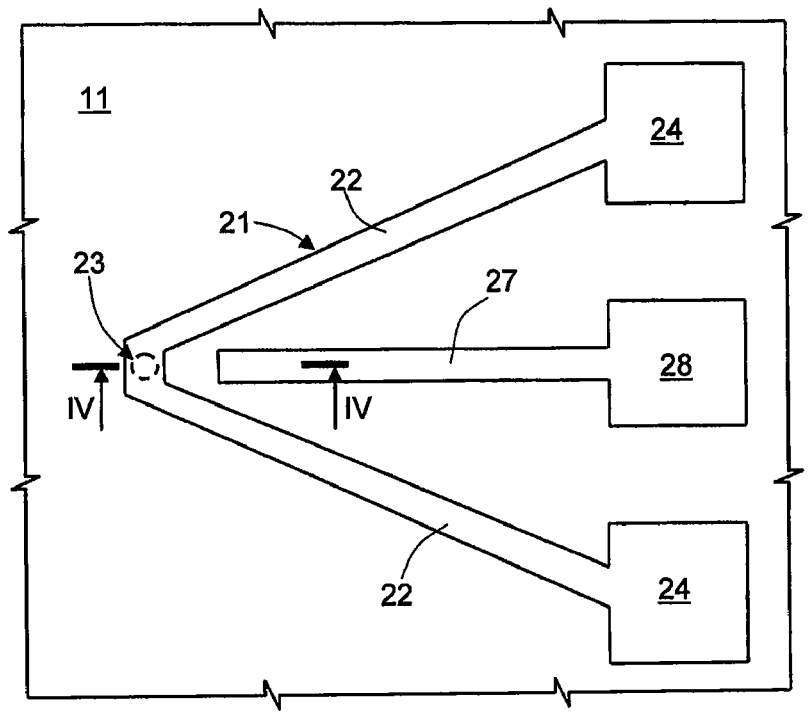
FIG. 5 is a top plan view of the intermediate structure of FIG. 4.

After definition of the metal layers 18, 19, a suspended structure 21 is formed, which, as may be seen in particular from the top plan view of FIG. 5, comprises a pair of supporting arms 22 arranged in a V that are joined at a first end to form a connection portion where the tip 23 is made (FIG. 4), which is countershaped with respect to the opening 16. The other ends of the supporting arms 22 widen to form respective pads 24. The suspended structure 21 moreover comprises a central arm 27, extending along a central symmetry axis of the supporting arms 22 as far as in proximity to the joining point of the supporting arms 22 and having also a widened end forming a pad 28. The pads 24, 28 can, however, be formed also in intermediate points of the arms 22, 27.

Figure 1:
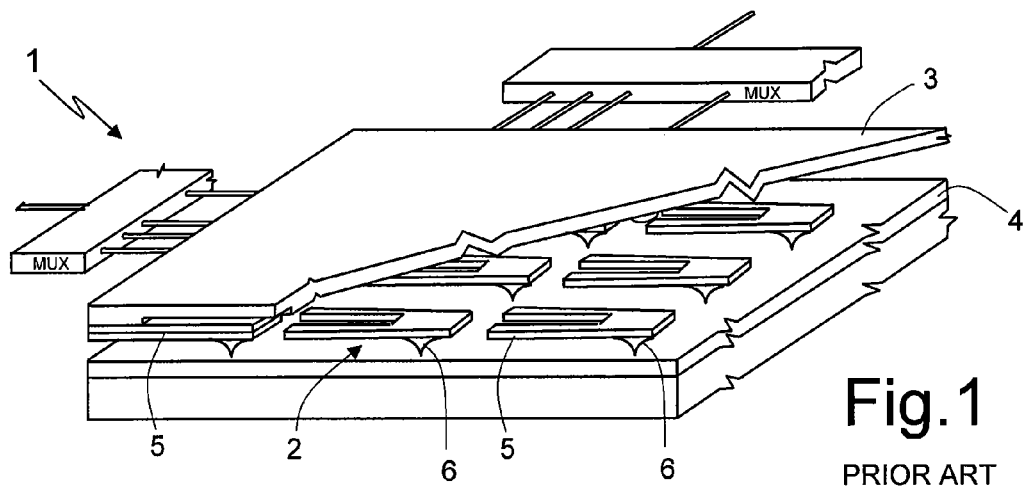
FIG. 1 is a schematic perspective representation, partially in cutaway view, of a probe-storage device.
Figure 6:
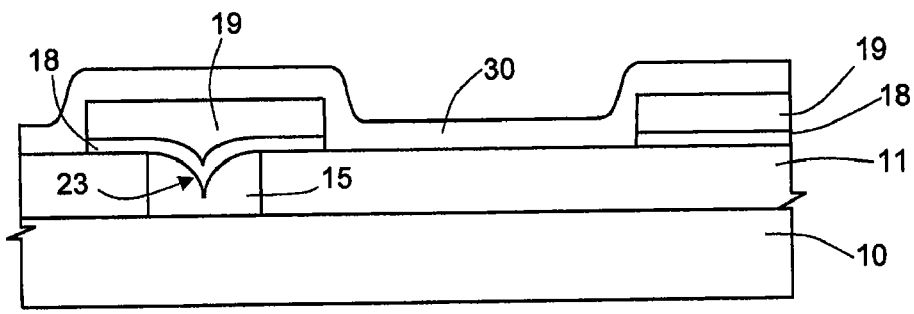
FIGS. 6 and 7 are cross-sections of the wafer of FIG. 4, in subsequent manufacturing steps.
Figure 7:
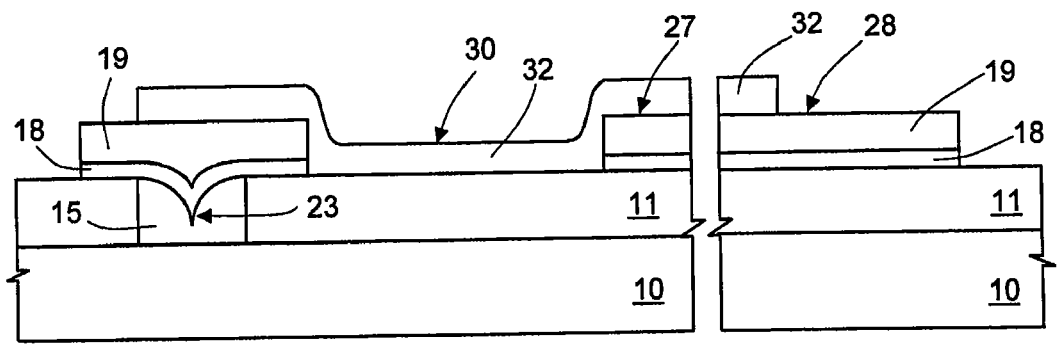

Next (FIG. 6), a dielectric layer 30, for example of aluminum oxide ($Al_2O_3$), is conformally deposited so as to extend in part on top of and in part laterally with respect to the suspended structure 21. The dielectric layer 30 is then defined (FIGS. 7 and 8) so as to form a framework 31 for mechanical connection and stiffening of the suspended structure 21. In particular, the framework 31 has the function, on the one hand, of bestowing stiffness and, on the other, mechanically interconnecting the arms 22, 27, maintaining separate electrical control of the pads 24 with respect to the pads 28. Thereby, the framework 31 enables electrostatic actuation of the suspended structure 21 and in particular displacement of the tip 23 in the direction of the axis z (in the vertical direction of FIG. 6 and perpendicular to the plane of the drawing in FIG. 8). In particular, the framework 31 enables an appropriate potential to be applied to the central arm 27 and thus (by capacitive effect with the storage medium 4 of FIG. 1) deflection thereof towards or away from the storage medium 4, causing a similar deflection of the entire suspended structure 21.

Figure 8:
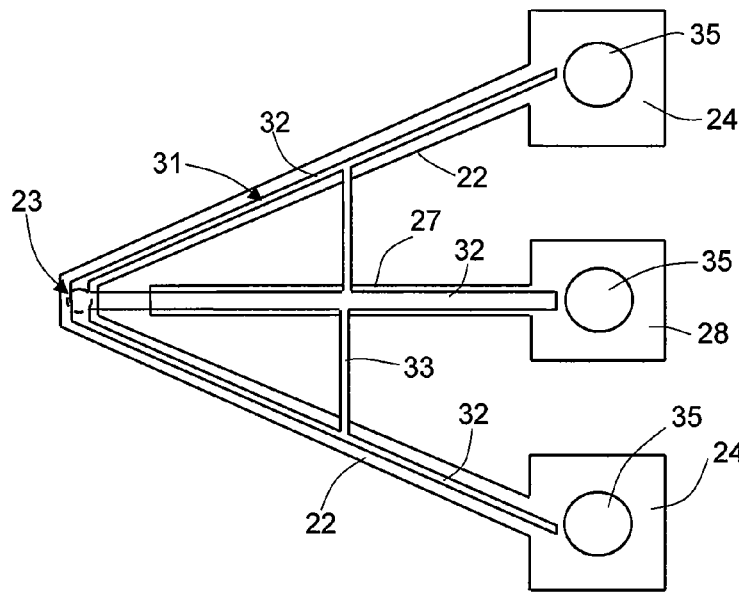
FIG. 8 shows a top plan view of the intermediate structure of FIG. 7.

In the example shown, the framework 31 is formed by three stiffening arms 32, which extend on top and in contact with the supporting arms 22 and the central arm 27, and are all connected at the vertex of the V formed by the supporting arms 22. The framework 31 moreover comprises at least one transverse arm 33, which crosses the three stiffening arms 32 and mechanically connects them at approximately half of their length. The structure of the framework 31 illustrated in FIG. 8 is in any case only indicative, and the shape, dimensions, and number of the supporting arms 32, 33 may of course vary.

Figure 9:
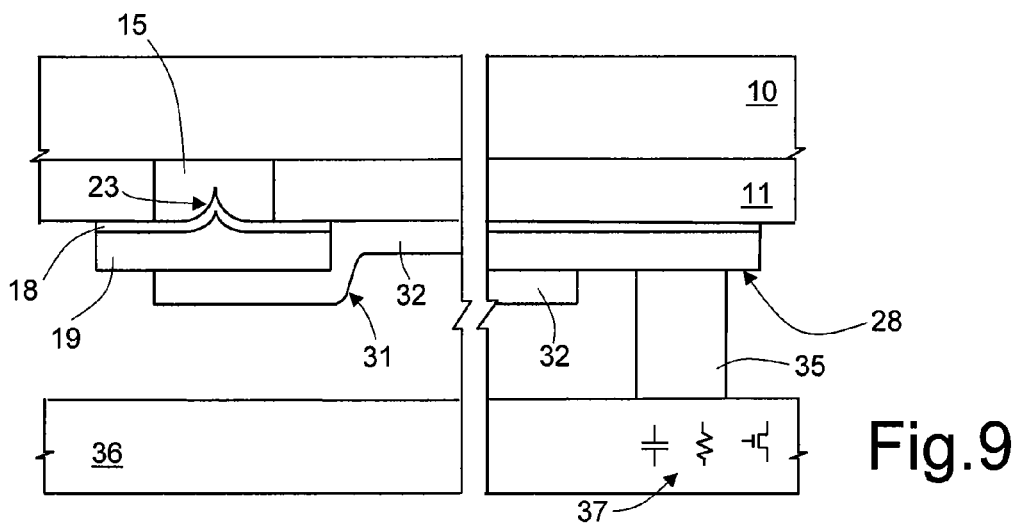
FIGS. 9-11 are cross-sections of the wafer of FIG. 7, in subsequent manufacturing steps.

Next (FIGS. 8 and 9), connection structures or plugs 35 are formed on the pads 24, 28. The plugs 35 can be obtained according to any known technique of wafer/wafer or die/wafer bonding, for example using a low-melting eutectic material formed by alternating layers (such as gold and tin).

Then (FIG. 9), a supporting wafer 36 is bonded to the structure so far obtained, using the plugs 35. In particular, the supporting wafer 36 is a wafer of semiconductor material, already processed so as to integrate the CMOS circuitry used for actuating and biasing the suspended structure 21, as well as for electronic control (reading, programming, erasing the data stored by the probe-storage system of FIG. 1), as represented schematically in FIG. 9 by components 37.

Figure 10:
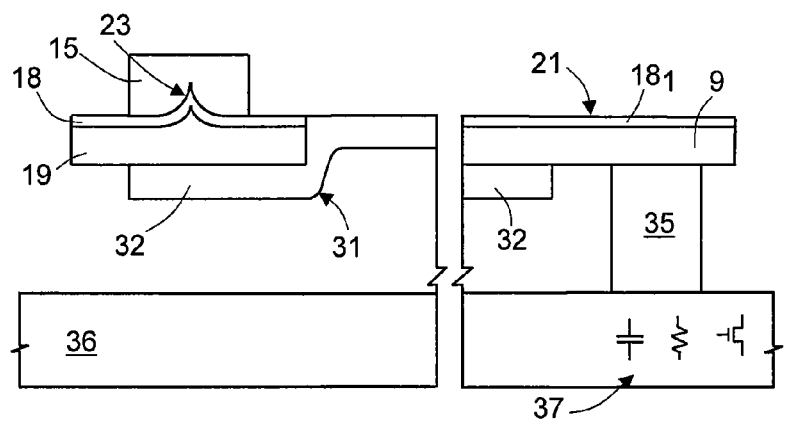
Figure 11:
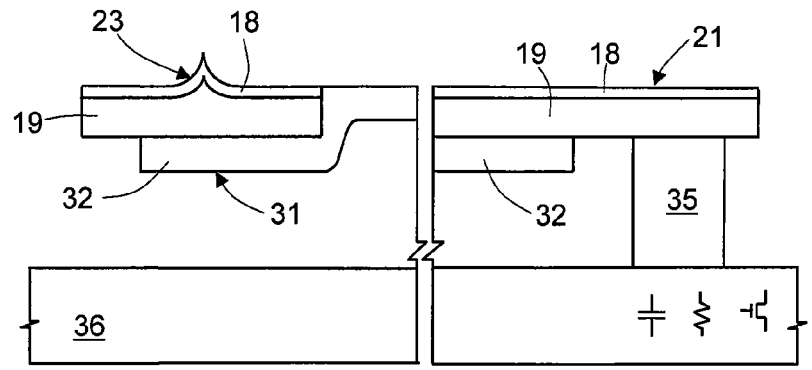

Finally (FIG. 10), the substrate 10 is removed via an etch-back step, and the sacrificial layer 11 is removed via a selective etch. In this step, the mold region 15 is preferably left so as to form a mechanical protection region for the tip 23 and is removed only at the end of the process for manufacturing the probe-storage system (FIG. 11).

The structure of the probe thus obtained has the following advantages:

simple manufacturing process, which enables low production costs, high reliability, and high yield to be obtained;

ease of integration on standard silicon substrates, which are more economical than the SOI substrate so far proposed, with further reduction in the production costs;

good protection of the tip 23 up to the end of the entire manufacturing process thanks to the mold region 15 that can be removed just at the end, guaranteeing high production yield;

possibility of forming the tip 23 of very small dimensions, down to a few nanometers, and thus of increasing the storage density of the system;

ease of modification of the dimensional characteristics of the tip, with the simple modification of the dimensions of the sacrificial layer 11, and/or of the window 13, and/or of the parameters for etching the shaper layer that gives rise to the mold region 15; this is particularly advantageous in so far as it enables adaptation of the characteristics of the tip to the needs, without having to modify other steps of the manufacturing process;

possibility of obtaining the characteristics of conductivity and of resistance useful for the tip and for the suspended structure by using of one or more suitable materials;

complete compatibility with standard CMOS processes; and possibility of forming a carbon nanotube on the tip 23 (as explained in greater detail hereinafter).

Figure 12:
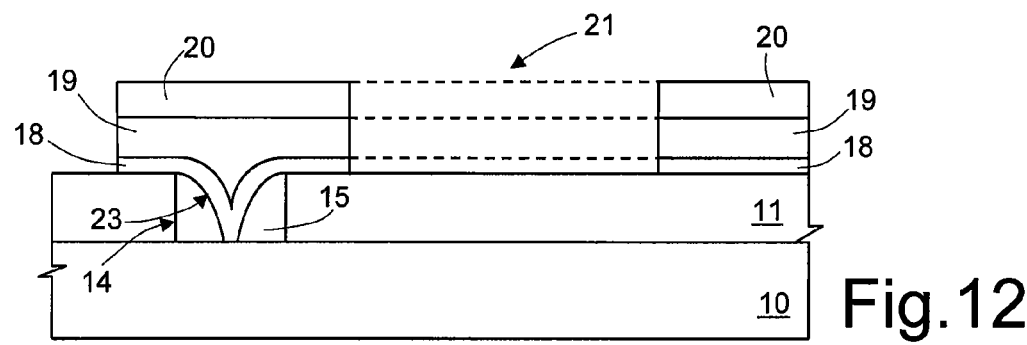
FIG. 12 shows a variation of the structure of FIG. 11, obtained starting from the intermediate structure of FIG. 11.

FIG. 12 shows a different embodiment, wherein the etch for forming the mold region 15 is not stopped when a wedge-shaped or cusp-shaped opening has been formed within the shaper layer, but proceeds until the substrate 10 is reached so that the mold region 15 has the shape of a quarter of a toroid and the opening 16 has a beveled bottom. Here, the tip 23 is less pointed than in the case represented in FIGS. 4-11. For example, the etch can be controlled so as to obtain an opening 16 having a bottom end of a few nanometers (for example, 3-7 nm).

Figure 13:
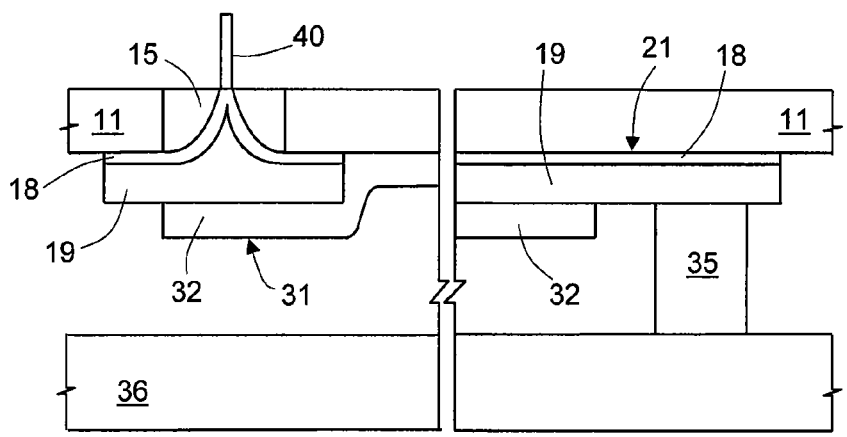
FIG. 13 shows a variation of the structure of FIG. 11.

This solution can be exploited for providing a carbon nanotube on the tip 23. In this case, when the first metal layer 18 is deposited, the latter forms a tip 23, the end whereof is in direct contact with the substrate 10 and has dimensions equal to the area of the bottom of the opening 16. Next, when the substrate 10 is removed via etch back, the end of the tip 23 is freed. From the uncovered end of the tip 23 it is possible to start growing a nanotube 40 in a per se known manner, via a self-aligned process, as may be seen in FIG. 13, which shows the structure of the probe after bonding to the supporting wafer 36 and removal of the substrate 10 by etch back.

Figure 14:
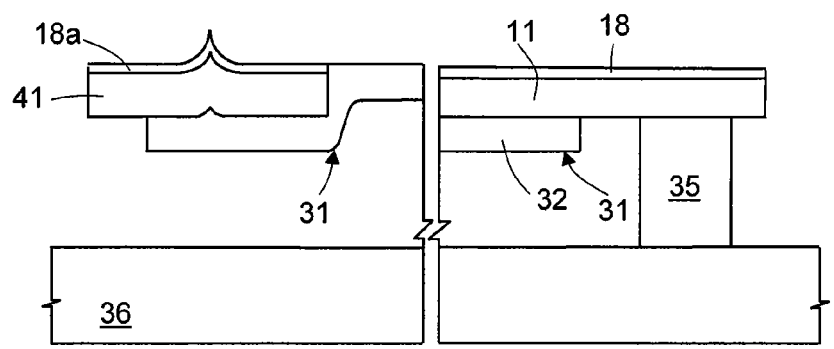
FIG. 14 shows another variation of the structure of FIG. 11.

FIG. 14 shows a variant wherein a single metal layer 18a is used for forming the tip 23. The second metal layer 19 of FIGS. 4-11 is replaced by an insulating layer 41, of suitable dielectric material (for example, silicon nitride or $Al_2O_3$) so as to compensate for the thermal coefficient of the first metal layer 18. In this case, before obtaining the plug 35, the insulating layer 41 is etched to enable direct contact between the plug 35 and the first metal layer 18.

According to another embodiment (not illustrated), it is possible to use just one metal layer 18. In this case, the single metal layer 18 has a larger thickness, for example of 100 nm. Alternatively, it is possible to use a plurality of metal layers arranged on top of one another, having appropriate characteristics of conductivity, resistance to wear, stiffness, etc. The stack of layers can comprise also appropriate non-metal conductive materials but having mainly a mechanical function.

Figure 15:
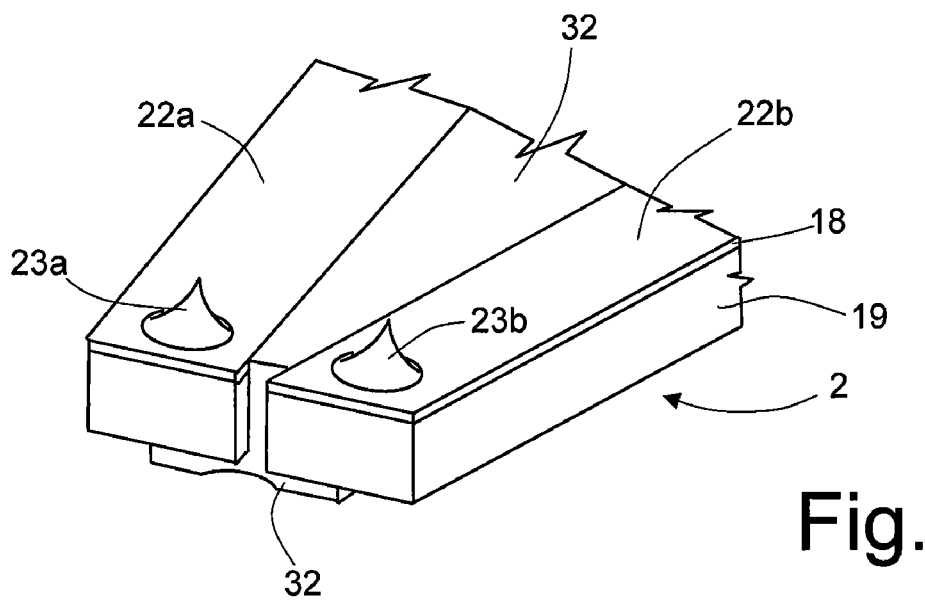
FIGS. 15-17 are perspective cutaway views of other embodiments of the invention.

FIG. 15 regards the formation of a pair of tips 23, instead of a single tip. This solution, described, for example, in international patent application No. PCT/IT/0600114 or in U.S. patent application No. US 2005/018616, enables, when reading is of a destructive type, immediate rewriting of the data read in the same portion of the storage medium. In this case, one of the two tips 23 (for example, the tip 23a) forms a read head, while the other tip (for example, the tip 23b) forms a write head. In practice, in this case, after deposition of the sacrificial layer 11, two adjacent holes (similar to the hole 14 of FIG. 2) are formed, giving rise to two mold regions 15. Consequently, when the metal layers 18, 19 are deposited, two tips 23a, 23b are formed. Next, the metal layers 18, 19 are shaped so as to form two separate supporting arms 22a, 22b, thus electrically insulated from one another. For the rest, the manufacturing process is similar to the above described with reference to FIGS. 4-11, and here the framework 31 serves also to mechanically connect the two supporting arms 22a, 22b.

Figure 16:
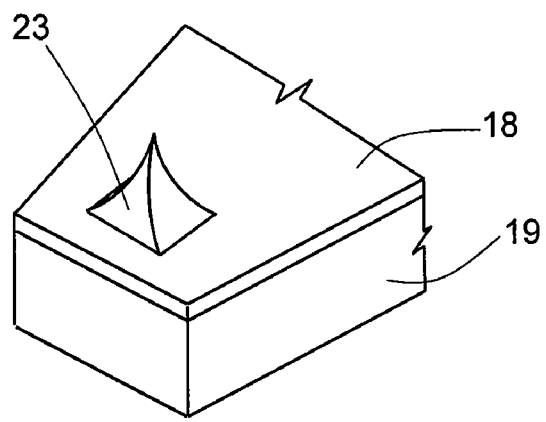

In the foregoing figures, the tip 23 has a conical shape with a concave wall. This shape is advantageously usable for storage systems which use chalcogenic materials. However, other shapes of tip 23 can be used. For example, the hole 14 of FIG. 2 can have a polygonal shape. In particular, the hole 14 can have a square shape, and in this case the tip 23 has a pyramidal shape, with hollowed faces, as illustrated in FIG. 16.

Figure 17:
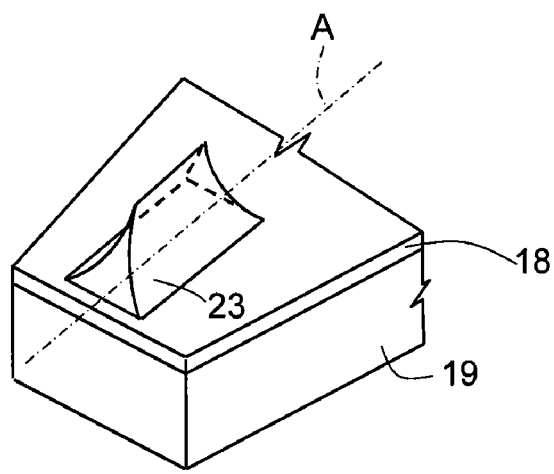

FIG. 17 shows an embodiment that can be obtained starting from a hole 14 of rectangular shape. In this case, the tip 23 has a length (corresponding to the long side of the hole 14) extending parallel to the symmetry axis of the probe, designated schematically by A. Alternatively, the largest dimension of the tip 23 (length) can extend perpendicularly or transversely to the symmetry axis A. The elongated solution is preferable in the case of a storage system of a ferroelectric type.

It is evident that modifications and variations can be made to the probe and to the manufacturing process described herein, without thereby departing from the scope of the present invention, defined by the annexed claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process, comprising:
    manufacturing a probe structured to interact with a storage medium of a probe-storage system, the manufacturing including:
    forming a mold region delimiting an opening having, in cross-section, a width decreasing from a base portion;
    forming a monolithic suspended structure of conductive material comprising a first interaction tip extending within the opening and countershaped with respect to the opening, wherein forming the monolithic suspended structure comprises:
        depositing a monolithic layer of electrically conductive material on top of said mold region, and
        defining, from the monolithic layer of electrically conductive material, the monolithic suspended structure which includes:
            a first supporting arm and said first interaction tip projecting monolithically from said first supporting arm,
            a second supporting arm extending laterally with respect to the first supporting arm, and
            a central arm spaced apart and electrically insulated from said first and second supporting arms; and
    forming a stiffening structure of insulating material on top of, and connecting mechanically, said first and second supporting arms and said central arm.

2. The process according to claim 1, further comprising forming a first contact pad on one of the first supporting arm and the second supporting arm and forming a second contact pad on the central arm, the central arm being configured to cause deflection of the suspended structure toward or away from the storage medium in response to an electrical bias being applied to the second contact pad.

3. The process according to claim 1, wherein the step of defining the monolithic layer of electrically conductive material comprises forming a connection portion that monolithically connects a first end of the first and second supporting arms and carrying the first interaction tip.

4. The process according to claim 1, wherein the first and second supporting arms have respective ends adjacent to one another but electrically separated from one another, the process comprising forming the first interaction tip at the end of the first supporting arm and a second interaction tip at the end of the second supporting arm.

5. The process according to claim 1, wherein the step of forming a mold region comprises depositing a sacrificial layer; forming a hole in the sacrificial layer;

depositing a mold layer; and removing the mold layer outside of the hole and partially inside the hole so as to form said opening.

6. The process according to claim 5, wherein the first interaction tip has a base having a shape chosen between circular and rectangular.

7. The process according to claim 5, wherein the step of removing is stopped before the opening completely traverses the mold layer within the hole.

8. The process according to claim 5, wherein the sacrificial layer is deposited on a supporting substrate and the step of removing is continued until the opening reaches the supporting substrate so that the first interaction tip has an end in contact with the supporting substrate.

9. The process according to claim 8, comprising removing the substrate and growing a carbon nanotube from the end of the first interaction tip.

10. The process according to claim 1, wherein the layer of conductive material is a multilayer that includes a first layer of a material chosen between titanium, compounds of titanium, cobalt, carbon, and metal barrier materials, and a second layer of a material chosen between TiN and aluminum.

11. The process according to claim 1, further comprising the steps of:
fixing the suspended structure to a supporting wafer with the first interaction tip facing away from said supporting wafer; and
removing the mold region.

12. The process according to claim 11, wherein the fixing comprises forming a conductive plug extending between a portion of said supporting arms and said supporting wafer.

13. The process according to claim 11, wherein the forming the mold region comprises depositing a mold layer on top of a semiconductor substrate, and the removing the mold region is preceded by removing the semiconductor substrate.

14. A probe structured to interact with a storage medium of a probe-storage system, comprising:
a support structure; and
a suspended structure of conductive material supported by and suspended from the support structure, the support structure including a conductive first supporting arm and an interaction tip projecting monolithically from the first supporting arm, wherein the suspended structure comprises:
a second supporting arm, extending transversely to the first supporting arm;
a central arm spaced apart and electrically insulated from said first and second supporting arms; and
a stiffening structure of insulating material, extending on top of, and connecting mechanically, said first and second supporting arms and said central arm.

15. The probe according to claim 14, wherein the interaction tip has a base having a shape chosen between circular and rectangular.

16. The probe according to claim 14, comprising a carbon nanotube extending from one end of the interaction tip.

17. The probe according to claim 14, wherein the suspended structure includes a conductive multilayer, comprising a first layer of a material chosen between titanium, compounds of titanium, cobalt, carbon, and metal barrier materials, and a second layer of a material chosen between TiN and aluminum.

18. The probe according claim 14, wherein the support structure includes a supporting wafer and a conductive plug extending between a portion of said suspended structure and the supporting wafer.

19. The probe according claim 14, wherein the suspended structure includes a first contact pad on one of the first supporting arm and the second supporting arm and a second contact pad on the central arm, the central arm being configured to cause deflection of the suspended structure toward or away from the storage medium in response to an electrical bias being applied to the second contact pad.

20. A probe-storage system, comprising:
a storage medium; and
a first probe structured to interact with the storage medium, the first probe including:
a support structure; and
a suspended structure of conductive material supported by and suspended from the support structure, the support structure including a conductive first supporting arm and an interaction tip projecting monolithically from the first supporting arm toward the storage medium, wherein the suspended structure comprises:
a second supporting arm, extending transversely to the first supporting arm;
a central arm spaced apart and electrically insulated from said first and second supporting arms; and
a stiffening structure of insulating material, extending on top of, and connecting mechanically, said first and second supporting arms and said central arm.

21. The probe-storage system according to claim 20, wherein the interaction tip has a base having a shape chosen between circular and rectangular.

22. The probe-storage system according to claim 20, comprising a carbon nanotube extending from one end of the interaction tip toward the storage medium.

23. The probe-storage system according to claim 20, wherein the suspended structure includes a conductive multilayer, comprising a first layer of a material chosen between titanium, compounds of titanium, cobalt, carbon, and metal barrier materials, and a second layer of a material chosen between TiN and aluminum.

24. The probe-storage system according to claim 20, wherein the support structure includes a supporting wafer and a conductive plug extending between a portion of said suspended structure and the supporting wafer.

25. The probe-storage system according to claim 20, further comprising:
a second probe structured to interact with the storage medium, the second probe including:
a support structure; and
a suspended structure of conductive material supported by and suspended from the support structure, the support structure including a conductive supporting arm and an interaction tip projecting monolithically from the supporting arm toward the storage medium.

26. The probe-storage system according to claim 20, wherein the suspended structure includes a first contact pad on one of the first supporting arm and the second supporting arm and a second contact pad on the central arm, the central arm being configured to cause deflection of the suspended structure toward or away from the storage medium in response to an electrical bias being applied to the second contact pad.

* * * * *